United States Patent
Ikuta et al.

(10) Patent No.: US 7,874,772 B2
(45) Date of Patent: Jan. 25, 2011

(54) MILLING SPINDLE OF MACHINE TOOL

(75) Inventors: Hiroki Ikuta, Komaki-shi (JP); Hiroki Tazawa, Konan-shi (JP); Jojiro Kimura, Ogaki-shi (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 12/562,359

(22) Filed: Sep. 18, 2009

(65) Prior Publication Data

US 2010/0074707 A1 Mar. 25, 2010

(30) Foreign Application Priority Data

Sep. 24, 2008 (JP) ............................. 2008-244664

(51) Int. Cl.
*B23C 5/26* (2006.01)
*B23C 5/28* (2006.01)
*B23Q 11/12* (2006.01)

(52) U.S. Cl. ...................... 409/135; 409/233; 409/231; 285/13; 285/98; 137/580

(58) Field of Classification Search ......... 409/231–233, 409/135–137, 134; 408/56–57, 239 R, 240; 138/580; 285/13–14, 98, 101, 95
See application file for complete search history.

(56) References Cited

U.S. PATENT DOCUMENTS

| | | | |
|---|---|---|---|
| 4,006,953 A | 2/1977 | Moritomo et al. | |
| 5,669,636 A | 9/1997 | Kubala | |
| 5,676,506 A * | 10/1997 | Sugata | 409/136 |
| 5,707,186 A | 1/1998 | Gobell et al. | |
| 5,922,941 A * | 7/1999 | Winkler et al. | 73/40 |
| 5,967,716 A * | 10/1999 | Katsuzawa et al. | 409/134 |
| 6,533,509 B1 * | 3/2003 | Antoun | 409/233 |
| 6,692,202 B2 * | 2/2004 | Katsuzawa et al. | 409/135 |
| 7,226,256 B2 | 6/2007 | Huang | |
| 7,677,847 B2 * | 3/2010 | Gebert | 409/231 |
| 7,692,553 B2 * | 4/2010 | Kubala | 340/605 |

(Continued)

FOREIGN PATENT DOCUMENTS

DE 19543612 11/1995

(Continued)

OTHER PUBLICATIONS

European search report for corresponding application No. EP 09405162.0 mailed Mar. 8, 2010.

(Continued)

*Primary Examiner*—Erica E Cadugan
(74) *Attorney, Agent, or Firm*—Renner, Otto, Boisselle & Sklar, LLP (57) ABSTRACT

The invention provides an improved drain structure of a cutting fluid supplied to a spindle of a milling spindle. The milling spindle 100 comprises a spindle 20 supported within a housing via a bearing 16, and a drawbar 24 having a through coolant passage 22. The cutting fluid $C_1$ passing through the rotary joint 40 and 50 is sent to the through coolant passage 22, but a portion thereof is collected in a drain chamber 110. When the pressure within the drain chamber rises, the drain device 150 pushes open the ball 160 resisting against the spring 170, and the cutting fluid $C_1$ is discharged to the exterior.

2 Claims, 9 Drawing Sheets

U.S. PATENT DOCUMENTS

| | | | |
|---|---|---|---|
| 2002/0159852 A1 | 10/2002 | Katsuzawa et al. | |
| 2007/0034265 A1* | 2/2007 | Mohr et al. | 137/580 |
| 2010/0074706 A1* | 3/2010 | Ikuta et al. | 409/233 |

FOREIGN PATENT DOCUMENTS

| | | |
|---|---|---|
| DE | 19630929 | 7/1996 |
| JP | 07-024687 | 1/1995 |
| JP | 2002-321138 | 11/2002 |
| WO | WO-90/09053 A1 * | 8/1990 |

OTHER PUBLICATIONS

Chinese Office Action for corresponding Chinese Application No. 200910170894.8 issued Sep. 13, 2010 (with English translation).

* cited by examiner

CROSS SECTIONAL VIEW OF A-A

MILLING SPINDLE OF MACHINE TOOL

The present application is based on and claims priority of Japanese patent application No. 2008-244664 filed on Sep. 24, 2008, the entire contents of which are hereby incorporated by reference.

BACKGROUND OF THE INVENTION

1. Field of the Invention

The present invention relates to a milling spindle of a machine tool, and more specifically, to a milling spindle of a machine tool having an improved drain (discharge) structure for draining (discharging) the cutting fluid leaked in the milling spindle.

2. Description of the Related Art

FIGS. 6 through 9 illustrate a general structure of a milling spindle of a machine tool.

Figure 6:
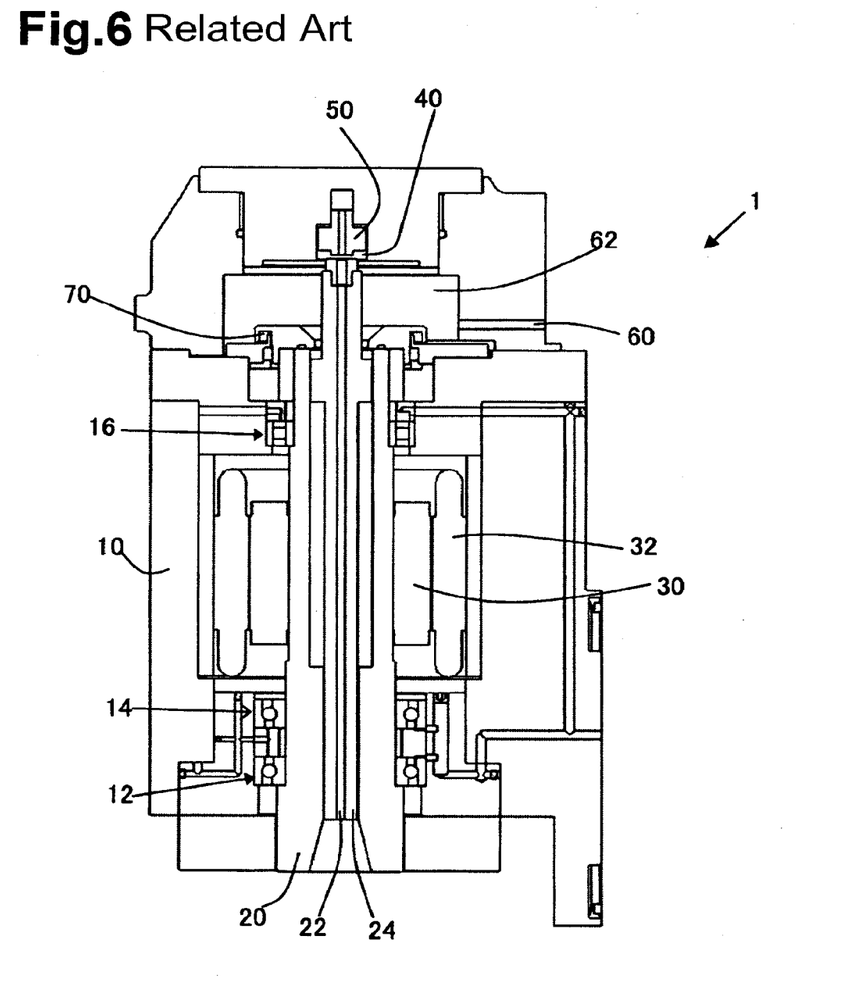
FIG. 6 is a cross-sectional view showing the structure of the milling spindle of a machine tool.
Figure 7:
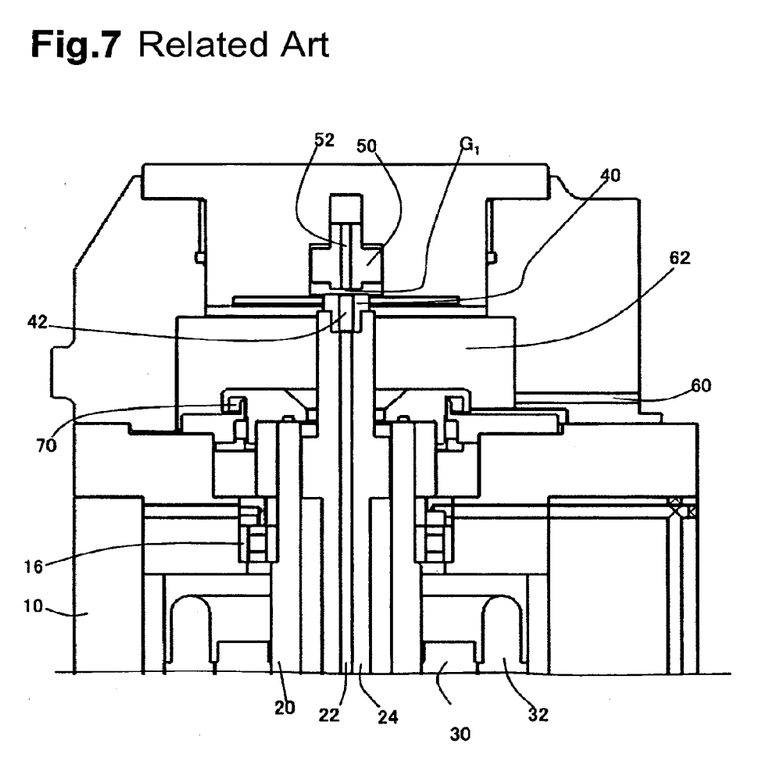
FIG. 7 is an enlarged cross-sectional view of the relevant portion thereof.

FIG. 6 is a cross-sectional view showing the structure of a milling spindle, and FIG. 7 is an enlarged cross-sectional view showing the relevant portion thereof.

A milling spindle denoted as a whole by reference number 1 includes a spindle 20 supported within a housing 10 via front-side bearings 12 and 14 and a rear-side bearing 16. A drawbar 24 for drawing a tool into the spindle or pushing a tool out of the spindle is disposed in the spindle 20, and at the center of the drawbar 24 is formed a through coolant passage 22 for supplying cutting fluid to the tool.

A rotor 30 of a motor is attached to an outer circumference portion of the spindle 20, defining a motor for directly driving the spindle with a stator 32.

A rotation-side joint 40 is attached to a rear end portion of the drawbar 24, which constitutes a rotary joint with a joint 50 fixed to the housing 10.

The cutting fluid supplied from a passage 52 of the fixed-side joint 50 is sent via a passage 42 of the rotation-side joint 40 to the through coolant passage 22. A fine gap $G_1$ is formed between the fixed-side joint 50 and the rotation-side joint 40, and a small amount of cutting fluid is leaked through this gap $G_1$.

Due to the structure of the rotary joint, it is difficult to prevent such leakage of cutting fluid completely.

Therefore, a structure is adopted in which a drain hole 60 communicating a drain chamber 62 formed within the housing 10 with the exterior of the housing is provided, so as to discharge the leaked cutting fluid to the exterior of the milling spindle.

The entry of cutting fluid to the bearing 16 or the motor unit 30 and 32 damages the drive unit composed of the bearing and motor and causes serious defects, so that a labyrinth device 70 is disposed to prevent the cutting fluid from entering the drive unit.

Figure 8:
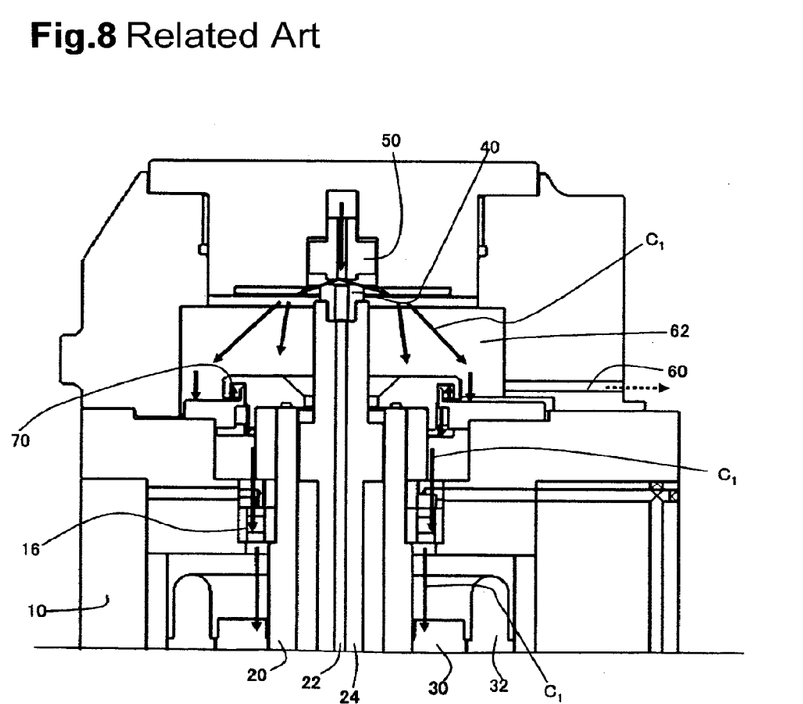
FIG. 8 is an explanatory view showing the flow of cutting fluid.

However, as shown in FIG. 8, if by some cause a large amount of cutting fluid $C_1$ leaks from the rotary joint portion into the drain chamber 62, the cutting fluid may not be sufficiently discharged through the drain hole 60, and a portion of the cutting fluid $C_1$ may pass through the labyrinth device 70 and damage the bearing 16 or the motor 30 and 32.

Figure 9:
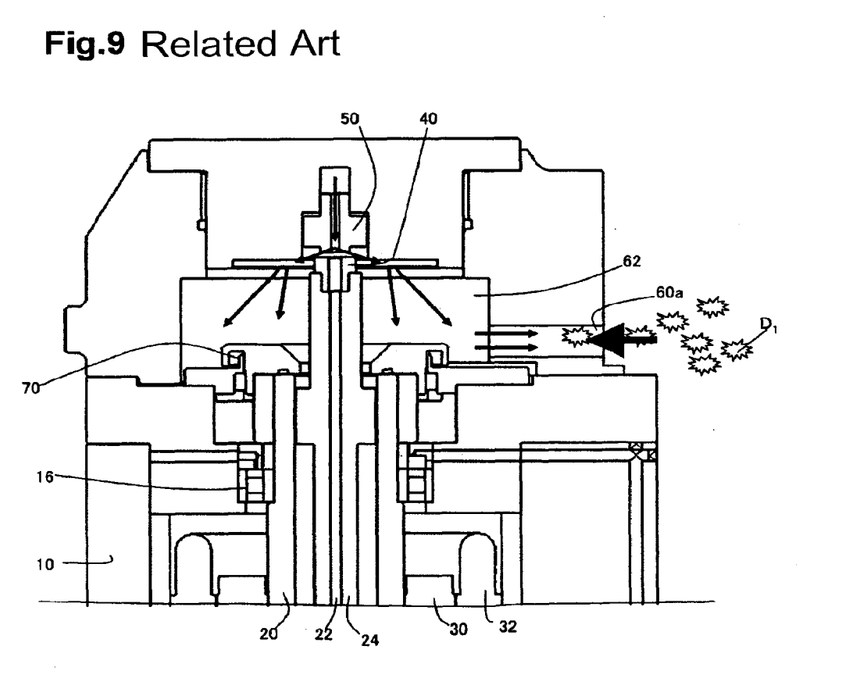
FIG. 9 is an explanatory view showing the flow of cutting fluid.

As shown in FIG. 9, if the drain hole 60a is widened to have a large diameter, there is a drawback that the drain hole may cause foreign substances $D_1$ such as swarf to enter from the exterior.

Japanese patent application laid-open publication No. 2002-321138 (patent document 1) discloses one example of a mechanism for preventing the cutting fluid leaked from the rotary joint portion of the spindle from entering the drive unit.

SUMMARY OF THE INVENTION

The present invention aims at solving the problems of the prior art by providing a milling spindle of a machine tool having a drain device capable of preventing entry of foreign substances from the exterior and discharging the leaked cutting fluid without fail.

In order to achieve the above objects, the present invention provides a milling spindle comprising a spindle supported via a bearing within a housing of the main spindle, a motor disposed within the housing for driving the spindle directly, a drawbar inserted slidably within the spindle, a through coolant passage disposed in an axial center of the drawbar for supplying cutting fluid, a rotary joint disposed on a rear end side of the drawbar for sending the cutting fluid supplied from a fixed side toward the rotating spindle, a drain chamber disposed within the housing for storing the cutting fluid leaked from the rotary joint, a drain passage for communicating the drain chamber with an exterior of the housing, and a drain device disposed within the drain passage.

The drain device comprises a cylindrical main body disposed within the drain passage, an inlet passage communicated with the drain chamber, an outlet passage communicated with the exterior, a valve seat formed within the inlet passage, a ball disposed on the outlet passage-side of the valve seat for opening and closing the valve seat, and a spring for biasing the ball toward the valve seat.

According to the milling spindle of a machine tool according to the present invention, the cutting fluid leaked from the rotary joint portion is stored in the drain chamber and discharged to the exterior via the drain device. The drain device constitutes a check valve having a backflow prevention function, so that even if a large amount of cutting fluid flows into the drain chamber, the cutting fluid can be discharged to the exterior without fail, and the entry of cutting fluid to the bearing and motor can be prevented.

Moreover, foreign substances such as swarf are prevented from entering from the exterior.

DETAILED DESCRIPTION OF THE PREFERRED EMBODIMENTS

Figure 1:
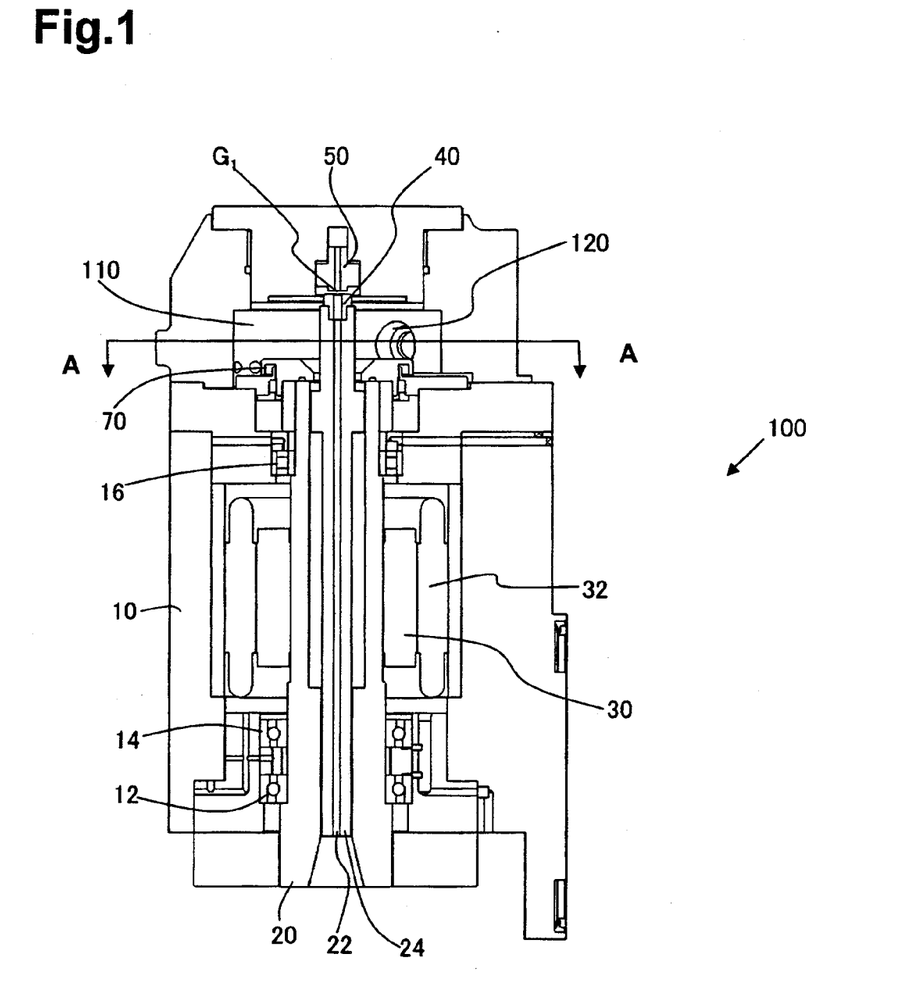
FIG. 1 is a cross-sectional view showing the milling spindle of a machine tool according to the present invention.
Figure 2:
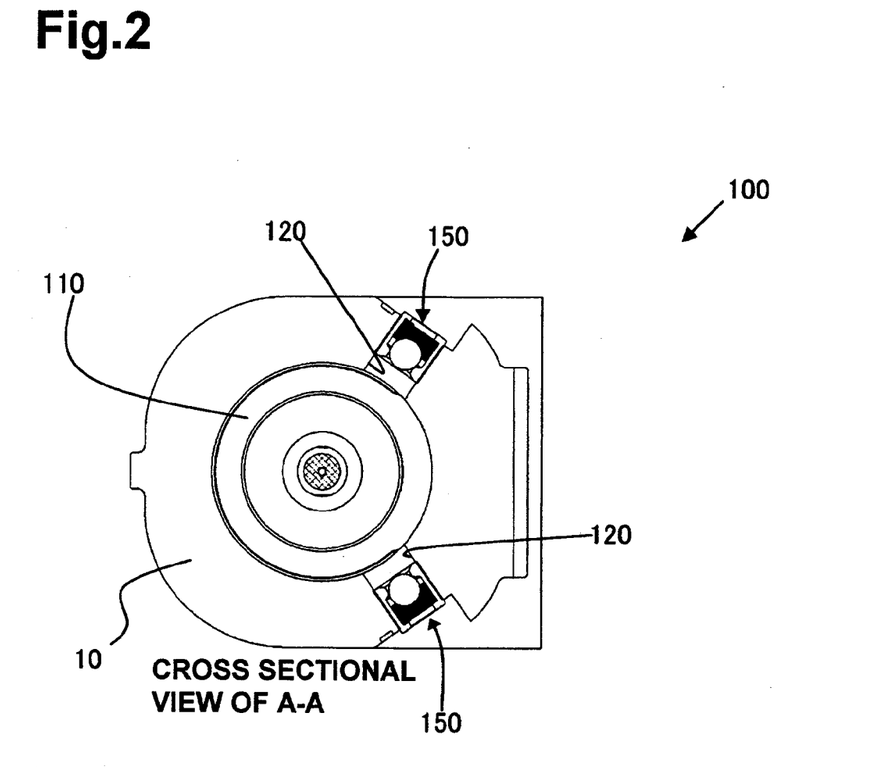
FIG. 2 is a cross-sectional view taken at A-A of FIG. 1.
Figure 3:
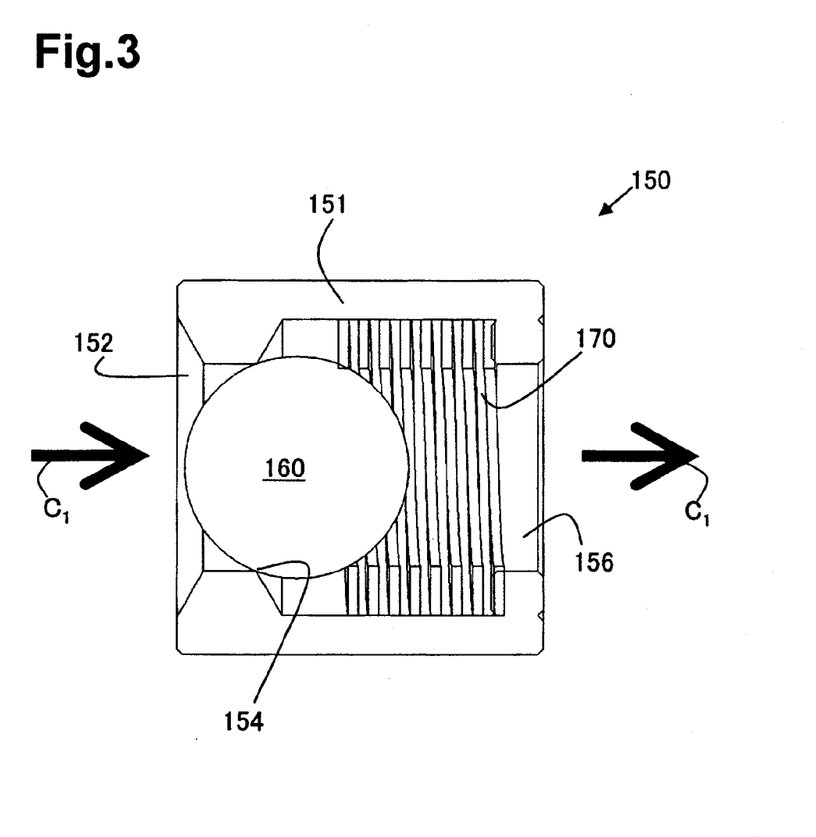
FIG. 3 is a cross-sectional view of the relevant portion of the present invention.
Figure 4:
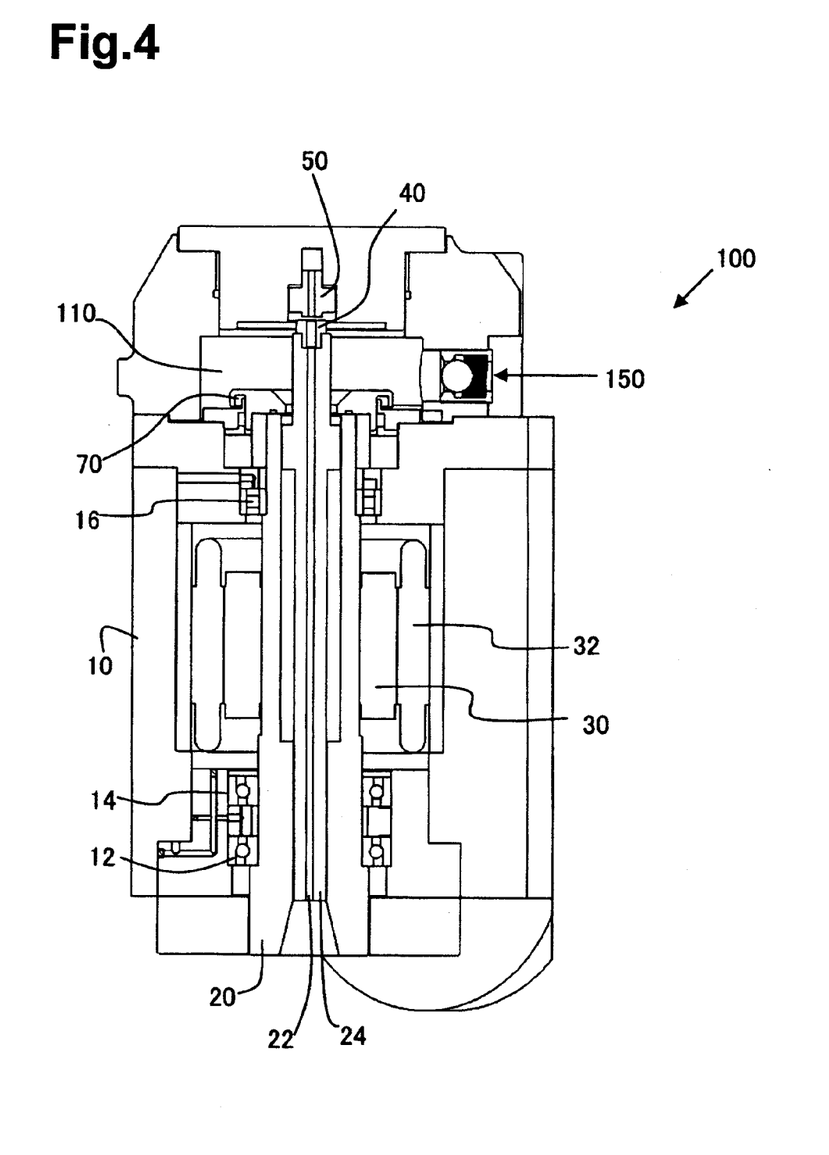
FIG. 4 is a cross-sectional view having changed the cutting plane of FIG. 1.

FIG. 1 is a cross-sectional view showing a structure of a milling spindle of a machine tool according to the present invention, FIG. 2 is a cross-sectional view taken at A-A of FIG. 1, FIG. 3 is a view showing the relevant portion thereof, and FIG. 4 is a cross-sectional view having changed the cutting plane of FIG. 1.

The milling spindle of the machine tool according to the present invention denoted as a whole by reference number 100 comprises a spindle 20 supported within a housing 10 via bearings 12, 14 and 16. The structures of a drawbar 24, a through coolant passage 22, a rotor 30, a stator 32 and a labyrinth device 70 are similar to those described with reference to FIGS. 6 through 9, so the components are denoted with the same reference numbers and the detailed descriptions thereof are omitted.

In the present milling spindle 100, similar to the prior art mentioned earlier, a rotary joint is formed by a fixed-side joint 50 and a rotation-side joint 40 attached to an end of a drawbar 24.

Similar to the aforementioned milling spindle, a gap $G_1$ is formed between the fixed-side joint 50 and the rotation-side joint 40.

The milling spindle 100 of the present invention also has a drain chamber 110 formed within a housing 10, but there are two drain passages 120 connecting the drain chamber 110 with the exterior of the housing 10. According to the present embodiment, two drain passages 120 are arranged at positions illustrated in FIG. 2.

A drain device denoted as a whole by reference number 150 is disposed in each drain passage 120.

FIG. 3 illustrates the details of the drain device 150. The drain device 150 has a cylindrical main body 151, and on one end of the main body 151 is formed an inlet passage 152, and on the other end of the body is formed an outlet passage 156.

An orifice (valve seat) 154 is formed in the inner side of the inlet passage 152, and a ball 160 having a greater outer diameter than the diameter of the valve seat 154 is disposed at a position coming into contact with the orifice 154.

A spring 170 is inserted to the side facing the outlet passage 156 of the ball 160, by which the ball 160 is biased toward the orifice 154.

Figure 5:
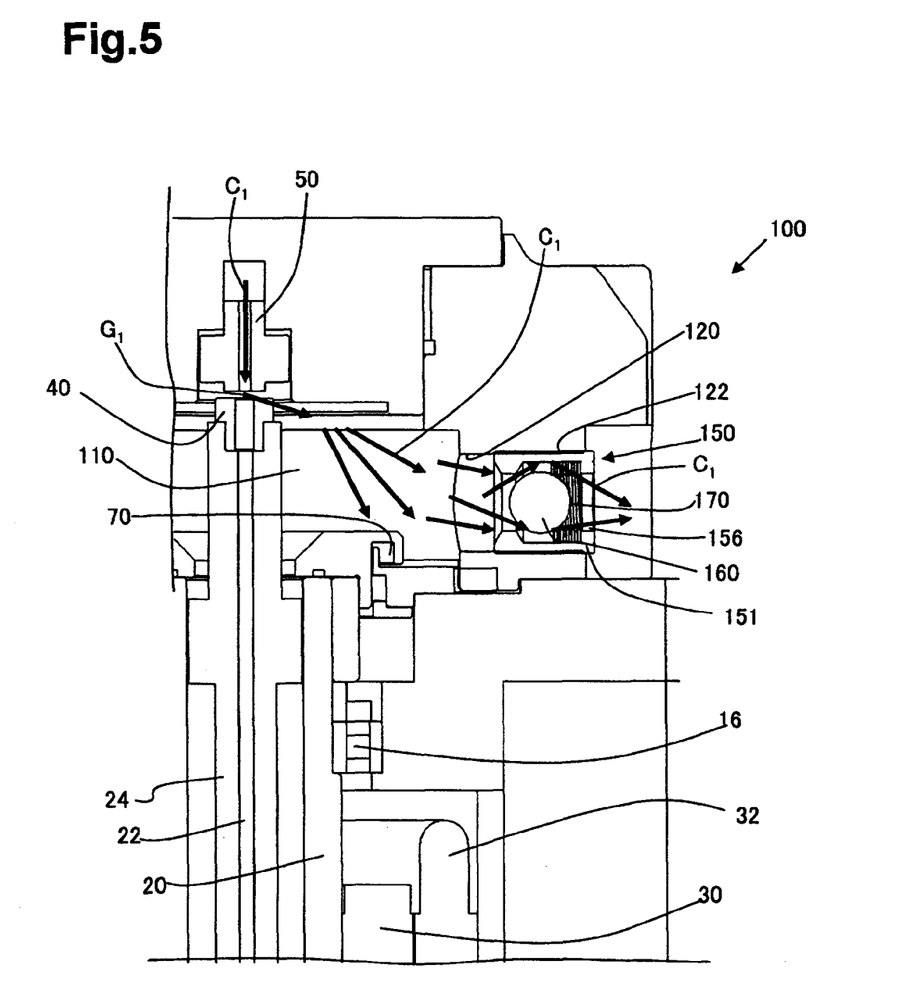
FIG. 5 is an explanatory view showing the functions of the present invention.

FIG. 5 illustrates the functions of the milling spindle 100 according to the present invention.

The cutting fluid $C_1$ supplied from the fixed-side joint 50 to the rotation-side joint 40 leaks through a gap $G_1$ into the drain chamber 110.

When the fluid pressure of the cutting fluid $C_1$ filled in the drain chamber 110 rises, the ball 160 pressed against the orifice is pushed open, resisting against the spring 170. The cutting fluid $C_1$ having passed through the space formed between the orifice and the ball 170 is discharged to the exterior through an outlet passage 156.

When the pressure within the drain chamber 110 drops, the ball 160 shuts the orifice. According to this operation, the excessive increase of pressure within the drain chamber 110 can be prevented, and the problem of the cutting fluid $C_1$ passing through the labyrinth device 70 and entering the drive unit can be overcome.

Since the drain device 150 according to the present invention has a check valve function as mentioned earlier, dust from the exterior is prevented from entering the drain chamber.

The drain device 150 is attached to the drain passage 120 via a screw portion 122 formed in the drain passage 120.

As described, in response to the cutting fluid supplied to the through coolant passage of the spindle being leaked from the rotary joint portion to the interior of the housing, the milling spindle of the machine tool according to the present invention comprises an arrangement in which the leaked cutting fluid is discharged via the drain device to the exterior.

Since the drain device also has the function of a check valve, even when a large amount of cutting fluid has been leaked, the fluid can be discharged smoothly to the exterior before the fluid pressure becomes excessive, thereby preventing the cutting fluid from entering the area with bearings and motors.

Furthermore, it is also possible to prevent dust or the like from entering from the exterior.

What is claimed is:

1. A milling spindle of a machine tool comprising:
   a rotary spindle supported via a bearing within a housing of the milling spindle;
   a motor disposed within the housing for driving the rotary spindle directly;
   a drawbar inserted slidably within the rotary spindle;
   a through coolant passage disposed in an axial center of the drawbar for supplying cutting fluid;
   a rotary joint disposed on a rear end side of the drawbar for sending the cutting fluid supplied from a fixed side of the rotary joint toward the rotary spindle;
   a drain chamber disposed within the housing for storing the cutting fluid leaked from the rotary joint;
   a drain passage communicating the drain chamber with an exterior of the housing; and
   a drain device disposed within the drain passage such that the leaked cutting fluid functions to cause the drain device to open.

2. The milling spindle of a machine tool according to claim 1, wherein
   the drain device comprises a cylindrical main body disposed within the drain passage, an inlet passage communicated with the drain chamber, an outlet passage communicated with the exterior of the housing, a valve seat formed within the inlet passage, a ball disposed on the outlet passage-side of the valve seat for opening and closing the valve seat, and a spring for biasing the ball toward the valve seat.

* * * * *